(12) United States Patent
Devreese (10) Patent No.: US 11,821,505 B2
(45) Date of Patent: Nov. 21, 2023

(54) SUN GEAR FOR USE IN A PLANETARY GEAR SYSTEM, COUNTER BEARING PART, BEARING ARRANGEMENT AND PLANETARY GEAR SYSTEM

(71) Applicant: Dana Belgium N.V., Bruges (BE)

(72) Inventor: Thibault Devreese, Bruges (BE)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 17/656,983

(22) Filed: Mar. 29, 2022

(65) Prior Publication Data

US 2022/0316575 A1 Oct. 6, 2022

(30) Foreign Application Priority Data

Mar. 30, 2021 (DE) ...................... 20 2021 101 694.9

(51) Int. Cl.
| | | |
|---|---|---|
| *F16H 55/17* | (2006.01) | |
| *F16H 57/04* | (2010.01) | |
| *F16H 57/08* | (2006.01) | |

(52) U.S. Cl.
CPC .......... *F16H 55/17* (2013.01); *F16H 57/043* (2013.01); *F16H 57/0482* (2013.01); *F16H 57/08* (2013.01)

(58) Field of Classification Search
CPC .... F16H 55/17; F16H 57/043; F16H 57/0482; F16C 17/047; F16C 17/045; F16C 33/1065; F16C 33/1075
See application file for complete search history.

(56) References Cited

U.S. PATENT DOCUMENTS

| | | | | | |
|---|---|---|---|---|---|
| 5,263,906 | A | * | 11/1993 | Antonov | F16D 25/123 |
| | | | | | 475/330 |
| 5,368,528 | A | * | 11/1994 | Farrell | F16C 19/48 |
| | | | | | 475/159 |
| 5,527,229 | A | * | 6/1996 | Ishihara | F16H 48/22 |
| | | | | | 475/248 |
| 5,910,063 | A | * | 6/1999 | Kato | F16H 57/082 |
| | | | | | 475/159 |
| 7,686,727 | B2 | * | 3/2010 | Hammill | F16H 57/0482 |
| | | | | | 184/6.12 |
| 8,062,165 | B2 | * | 11/2011 | Chen | F16C 33/1065 |
| | | | | | 475/331 |
| 10,215,271 | B2 | * | 2/2019 | Grimm | F16H 57/043 |
| 10,948,071 | B2 | * | 3/2021 | Meyer | F16H 57/0486 |

FOREIGN PATENT DOCUMENTS

| | | | |
|---|---|---|---|
| CN | 212564323 U | * | 2/2021 |
| JP | 2000320649 A | * | 11/2000 |
| JP | 2006183702 A | * | 7/2006 |

\* cited by examiner

*Primary Examiner* — Sherry L Estremsky
(74) *Attorney, Agent, or Firm* — McCoy Russell LLP (57) ABSTRACT

Systems and methods for a sun gear, counter bearing parts, and bearing arrangements. The gear comprising a helical toothing and a first and a second thrust surface which are configured to axially support the sun gear at a first and a second counter thrust surface, respectively, wherein the first and the second thrust surface have a thrust generating geometry that is configured to build up a lubrication fluid film between the first thrust surface and the first counter thrust surface and between the second thrust surface and the second counter thrust surface during rotation of the sun gear. The counter bearing part for axially supporting a sun gear, and to a bearing arrangement for axially supporting a sun gear.

19 Claims, 6 Drawing Sheets

Fig. 10

SUN GEAR FOR USE IN A PLANETARY GEAR SYSTEM, COUNTER BEARING PART, BEARING ARRANGEMENT AND PLANETARY GEAR SYSTEM

CROSS REFERENCE TO RELATED APPLICATION

The present application claims priority to German Utility Model Application 20 2021 101 694.9, entitled "SUN GEAR FOR USE IN A PLANETARY GEAR SYSTEM, COUNTER BEARING PART, BEARING ARRANGEMENT AND PLANETARY GEAR SYSTEM", and filed on Mar. 30, 2021. The entire contents of the above-listed application is hereby incorporated by reference for all purposes.

TECHNICAL FIELD

The present disclosure relates to a sun gear for use in a planetary gear system, a bearing arrangement of a sun gear, a counter bearing part of the bearing arrangement of the sun gear and a planetary gear system comprising the aforementioned parts. The present disclosure may relate to a sun gear, a counter bearing part, a bearing arrangement and a planetary gear system for electric vehicles.

BACKGROUND AND SUMMARY

Planetary gear systems usually comprise a sun gear, planet gears and a ring gear. A sun gear is usually pivoted within the planetary gear system using roller bearings. Roller bearings comprise a plurality of parts. Since it is a common aim to reduce complexity of mechanical parts, thrust bearings may be considered as an alternative. A sun gear having a helical toothing generates an axial reaction load during operation which needs to be counteracted by the bearing.

An object of the present disclosure is to provide a sun gear for use in a planetary gear system and a counter bearing part that reduce the number of components in and complexity of a bearing arrangement and enable a stable and low friction support of the sun gear. A further object is to provide a bearing arrangement that has a reduced number of components and reduced complexity and enables a stable and low-friction support of the sun gear. A further object is to provide a planetary gear system comprising such an above mentioned sun gear, counter bearing part and/or bearing arrangement.

A sun gear according to the present disclosure for use in a planetary gear system comprises a helical toothing and a first and a second thrust surface which are configured to axially support the sun gear at a first and a second counter thrust surface, respectively, wherein the first and the second thrust surface have a thrust generating geometry that is configured to build up a lubrication fluid film between the first thrust surface and the first counter thrust surface and between the second thrust surface and the second counter thrust surface during rotation of the sun gear.

The first and second thrust surface enable a thrust bearing of the sun gear. A thrust bearing has a lower number of parts and reduced complexity than a conventional roller bearing. Reduced complexity results in reduced pricing of the bearing arrangement and components and simplifies assembly procedure.

Moreover, the lubrication fluid film that is build up between the first and second thrust surfaces and the first and second counter thrust surfaces, respectively, exerts a counter force to the thrust force of the sun gear during operation, the thrust force resulting from the rotation of the helical toothing of the sun gear during rotation. Thus, the sun gear, counter bearing part, and bearing arrangement enable stable and low-friction support of the sun gear within a planetary gear system.

According to an embodiment of the sun gear, the trust generating geometry of the first and/or second thrust surface may be a wedge shape geometry comprising a plurality of wedge shape area sectors that differ in height. The first and/or second thrust surface may comprise five identical sectors. The sectors may cover the entire circumference of the thrust surface. Each sector may have features which cover a portion of a radial thrust surface. For example, if there are five sectors, each sector would cover 71°, however features that are not planar to the thrust surface may only cover a sector angle between 59° and 63°, such as of 61°. Hereinafter, sector angle will refer to the angle in which features that vary in height are present. For example, a ramped or stepped geometry may cover an angle between 59° and 63° and repeat in five sectors.

According to a further embodiment of the sun gear, the first and/or second thrust surface may comprise a plurality of radially disposed grooves for supplying lubricating oil to the first and second thrust surface, respectively.

According to a further embodiment of the sun gear, the first and/or second thrust surface may be a Rayleigh-Step (RS) thrust surface. The RS thrust surface may comprise five area sectors, each area sector comprising a step. A surface of each area sector may be orthogonal to a rotation axis of the sun gear. An optimal step height of the Rayleigh-Step thrust surface may be between 1.5 and 2.5 µm, such as 2 µm and may be located between 55% and 59%, such as at 57%, of each sector angle. The step height may be defined as a height difference within each sector or as a height difference between two adjacent sectors.

According to a further embodiment of the sun gear, the first and/or second thrust surface may be a Tapered-Land (TL) thrust surface. The TL thrust surface may comprise five area sectors, each sector having a flat-land section followed by a linear ramp section that rises from an end of the flat-land section to an end of the area sector. A flat-land height of each flat-land section of the Tapered-Land thrust surface may be between 3.5 and 4.5 µm, for example 4 µm, and the linear ramp section of the Tapered-Land thrust surface may extend up to between 72% and 76%, such as 74%.

The present disclosure further relates to a counter bearing part for axially supporting a sun gear. The counter bearing part comprises a first or a second counter thrust surface for axially supporting a sun gear at a first thrust surface or at a second thrust surface, respectively, of a sun gear, wherein the first or second counter thrust surface has a thrust generating geometry that is configured to build up a lubrication fluid film between the first or second counter thrust surface and the first thrust surface or the second thrust surface, respectively, of the sun gear during rotation of the sun gear.

In an embodiment of the counter bearing part, the trust generating geometry of the first and/or second counter thrust surface may be a wedge shape geometry comprising a plurality of wedge shape area sectors that differ in height. The first or second thrust surface may comprise five identical sectors, each sector covering a sector angle between 59° and 63°, for instance of 61°, and varying in height.

In another embodiment of the counter bearing part, the first or second counter thrust surface may comprise a plurality of radially disposed grooves for supplying lubricating oil to the first or second thrust surface, respectively.

In another embodiment of the counter bearing part, the first or second counter thrust surface may be a Rayleigh-Step (RS) thrust surface. The RS thrust surface may comprise five area sectors, each area sector comprising a step. A surface of each area sector may be orthogonal to a rotational axis of the sun gear. An optimal step height of the Rayleigh-Step thrust surface may be between 1.5 and 2.5 µm, such as 2 µm and may be located between 55% and 59%, for instance at 57%, of each sector angle. The step height may be defined as a height difference within each sector or as a height difference between two adjacent sectors.

According to a further embodiment of counter bearing part, the first and/or second counter thrust surface may be a Tapered-Land (TL) thrust surface. The TL thrust surface may comprise five area sectors, each sector having a flat-land section followed by a linear ramp section that rises from an end of the flat-land section to an end of the area sector. An optimal flat-land height of each flat-land section of the Tapered-Land thrust surface may be between 3.5 and 4.5 µm, for instance 4 µm, and the linear ramp section of the Tapered-Land thrust surface may extend up to between 72% and 76%, such as 74%.

The present disclosure further relates to a bearing arrangement for axially supporting a sun gear, comprising a sun gear having a helical toothing and a first and a second thrust surface which are configured to axially support the sun gear at a first and a second counter thrust surface, respectively, a first counter bearing part comprising the first counter thrust surface for axially supporting the sun gear at the first thrust surface, and a second counter bearing part comprising the second counter thrust surface for axially supporting the sun gear at the second thrust surface, wherein the first and the second thrust surface, or the first thrust surface and the second counter thrust surface, or the second thrust surface and the first counter thrust surface, or the first counter thrust surface and the second counter thrust surface, or the first and second thrust surface and the first and second counter thrust surface have a thrust generating geometry, the thrust generating geometry being configured to build up a lubrication fluid film between the first thrust surface and the first counter thrust surface and between the second thrust surface and the second counter thrust surface during rotation of the sun gear.

In an embodiment of the bearing arrangement, the sun gear may have a multi-part structure comprising a main body part, a first thrust washer and a second thrust washer, the first thrust washer comprising the first thrust surface, and the second thrust washer comprising the second thrust surface, and wherein the main body part comprises the helical toothing. In some cases, it is cheaper and more practical to employ washers in the bearing arrangement of the sun gear than having a single-piece sun gear sliding against a counter bearing part. These cases may include heat treatment and machining of the thrust surface.

In a further embodiment of the bearing arrangement, the first and second thrust washers may each be disposed on a side of the main body part along an axial direction of the sun gear opposite the first and second counter thrust surface, respectively.

In a further embodiment of the bearing arrangement, the sun gear may be integrally formed or connected in one piece.

In a further embodiment of the bearing arrangement, the trust generating geometry may be a wedge shape geometry comprising a plurality of wedge shape area sectors that differ in height. One or more of the thrust surfaces and counter thrust surfaces having the thrust generating geometry may comprise five identical sectors, each sector covering a sector angle between 59° and 63°, for instance of 61°, and varying in height.

In a further embodiment of the bearing arrangement, one or more of the thrust surfaces and counter thrust surfaces having the thrust generating geometry may comprise a plurality of radially disposed grooves for supplying lubricating oil to the respective thrust surfaces or counter thrust surfaces.

In a further embodiment of the bearing arrangement, one or more of the thrust surfaces and counter thrust surfaces having the thrust generating geometry may be a Rayleigh-Step (RS) thrust surface. The RS thrust surface may comprise five area sectors, each area sector comprising a step. A surface of each area sector may be orthogonal to a rotational axis of the sun gear. A step height of the Rayleigh-Step thrust surface may be between 1.5 and 2.5 µm, such as 2 µm and may be located between 55% and 59%, for instance at 57%, of each sector angle. The step height may be defined as a height difference within each sector or as a height difference between two adjacent sectors.

In a further embodiment of the bearing arrangement, one or more of the thrust surface and counter thrust surface having the thrust generating geometry may be a Tapered-Land (TL) thrust surface. The TL thrust surface may comprise five area sectors, each sector having a flat-land section followed by a linear ramp section that rises from an end of the flat-land section to an end of the area sector. A flat-land height of each flat-land section of the Tapered-Land thrust surface may be between 3.5 and 4.5 µm, such as 4 µm, and the linear ramp section of the Tapered-Land thrust surface may extend up to between 72% and 76%, for instance 74%.

The present disclosure further includes a planetary gear system comprising a sun gear as described above and/or a counter bearing part as described above, or a bearing arrangement as described above.

The bearing arrangement comprising a sun gear and/or a counter bearing part according to the present disclosure works in all operating conditions of an axle engaged with the sun gear. When the axle is in drive mode, one of the first and second thrust surfaces will be loaded due to the axial thrust force of the sun gear and will generate a lubrication fluid film that exerts an axial counter force to the axial thrust force of the sun gear. During regeneration mode, the other one of the first and second thrust surfaces will be loaded. When one of the first and second thrust surface is in contact with the respective counter thrust surface and will be loaded, the other one of the first and second thrust surface is not in contact with the respective counter thrust surface and will be unloaded. The loaded first or second thrust surfaces will rotate at a different speed than the unloaded thrust surface and due to the thrust generating geometry a fluid film of lubrication fluid will be build up. This fluid film allows to counteract the axial load resulting from the rotating sun gear.

No external control of the bearing system is needed. The thrust generating geometry is used as control. The working principle is based on the formation of a fluid film under pressure between two rotating surfaces.

In the following, embodiments of the sun gear, a counter bearing part and a bearing arrangement according to the present disclosure are described in more detail on the basis of the following figures. The described features are not only conceivable in the combination of the disclosed embodiment, but can be realized independently of the concrete embodiment in various other combinations. In the figures, equal or similar features are denoted by equal or similar reference signs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
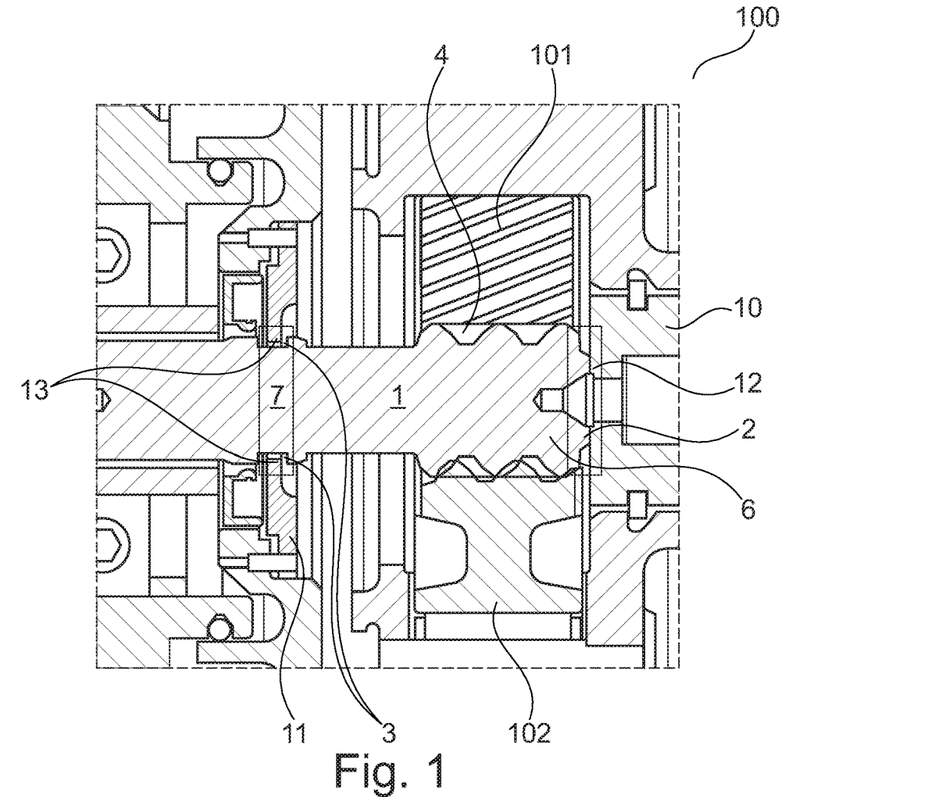
FIG. 1 shows a sectional view of a planetary gear system with a bearing arrangement for a sun gear according to a first embodiment.

FIG. 1 shows a sectional view of a planetary gear system 100 with a bearing arrangement for a sun gear 1 according to a first embodiment. In the planetary gear system 100 of FIG. 1, the sun gear 1 is axially supported by a first counter bearing part 10, which is a second shaft disposed at a first end 6 of the sun gear 1 and axially aligned with the sun gear 1. In a middle part 7 of the sun gear 1, the sun gear 1 is supported by a second counter bearing part 11 that encloses the sun gear 1 concentrically. At the first end 6 of the sun gear 1, the sun gear 1 comprises a helical toothing 4. The helical toothing 4 is in mesh with a first and a second planetary gear 101 and 102 that circulate around the sun gear 1 during operation.

At the first end 6, the sun gear 1 further comprises a first thrust surface 2 adjacent to the first counter bearing part 10. The counter bearing part 10 comprises a first counter thrust surface 12 adjacent to the first thrust surface 2 of the sun gear 1. The first thrust surface 2 or the first counter thrust surface 12 or both surface 2 and 12 have been processed such that a thrust generating geometry has been formed. This thrust generating geometry is configured such that during operation a fluid film is formed between the first thrust surface 2 and the first counter thrust surface 12. The fluid film comprises lubrication fluid that is used in the planetary gear system 100 for ensuring optimal operation of the gear system 100. Furthermore, in the middle part 7 of the sun gear 1, the sun gear 1 comprises a second thrust surface 3 adjacent to the second counter bearing part 11 radially enclosing the middle part 7 of the sun gear 1. The counter bearing part 11 comprises a second counter thrust surface 13 adjacent to the second thrust surface 3. Similar to the first thrust surface 2 and the first counter thrust surface 12, the second thrust surface 3 or the second counter thrust surface 13 or both surfaces 3 and 13 have been processed such that a thrust generating geometry has been formed. This thrust generating geometry is configured such that during operation a fluid film is formed between the second thrust surface 3 and the second counter thrust surface 13. Either the first thrust surface 2 and the second thrust surface 3, or the first counter thrust surface 12 and the second counter thrust surface 13, or the first thrust surface 2 and the second counter thrust surface 13, or the second thrust surface 3 and the first counter thrust surface 12 or all surface 2, 3, 12 and 13 may include a thrust generating geometry to allow formation of a lubrication fluid film. The lubrication fluid film produces a counter force to the thrust force of the sun gear 1 that results from the rotation of the helical toothing 4 during operation of the sun gear 1. The thrust geometry is thereby configured such that the sun gear 1 is precisely supported in between the first and second counter bearing parts and can rotate with low friction between the thrust and counter thrust surfaces 2, 3 and 12, 13.

Figure 2:
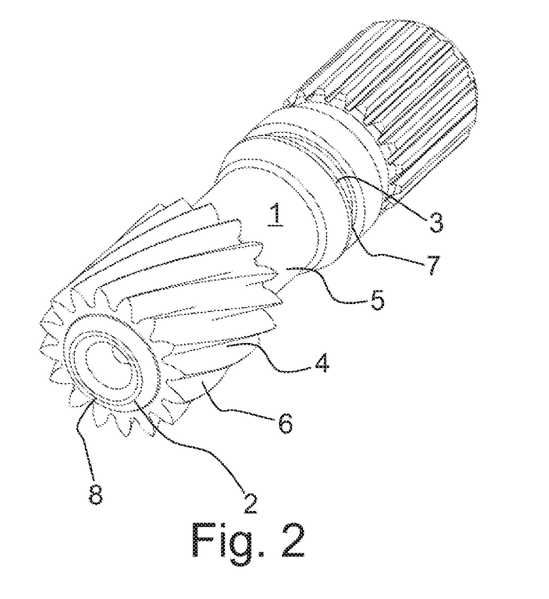
FIG. 2 shows a three-dimensional view of a sun gear according to the first embodiment.

FIG. 2 shows a three-dimensional view of a sun gear according to the first embodiment. At the first end 6 of the sun gear 1, the sun gear comprises a protruding portion 8 carrying the circular thrust surface 2. Next to the protruding portion 8, the sun gear 1 comprises the helical toothing 4. In the middle part 7, the sun gear 1 comprises the second thrust surface 3 which faces away from the first end 6 and thus in an opposite direction of the first thrust surface 2. The protruding portion 8 with the thrust surface 2 is disposed next to the counter thrust surface 12 of the counter bearing part 10 in FIG. 1. The middle part 7 with the thrust surface 3 is disposed within the second counter bearing part 11 such that the second thrust surface 3 faces the second counter thrust surface 13.

Figure 3:
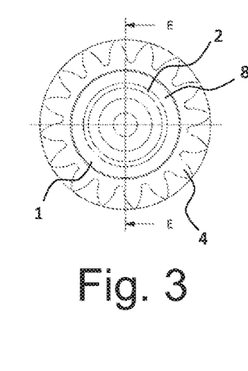
FIG. 3 shows a plan view of a first thrust surface of the sun gear of FIG. 2 according to the first embodiment.

FIG. 3 shows a plan view of a first thrust surface of the sun gear of FIG. 2 according to the first embodiment. The protruding portion 8 with the first thrust surface 2 is disposed at a distance of a half of the maximal outer radius of the sun gear 1 from the rotation axis of the sun gear 1. The outer radius of the sun gear 1 is limited by the outer circumference of the helical toothing 4.

Figure 4:
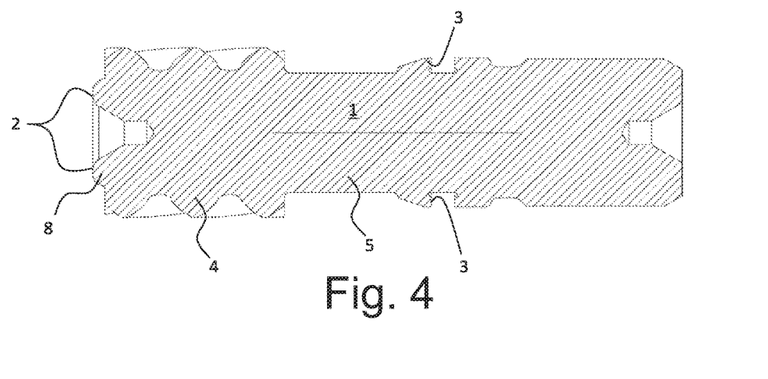
FIG. 4 shows an axial section of the sun gear of FIG. 2 according to the first embodiment.

FIG. 4 shows an axial section of the sun gear of FIG. 2 according to the first embodiment. Moreover, FIG. 4 shows the first and second thrust surfaces 2 and 3 of the sun gear 1 facing away from one another.

Figure 5:
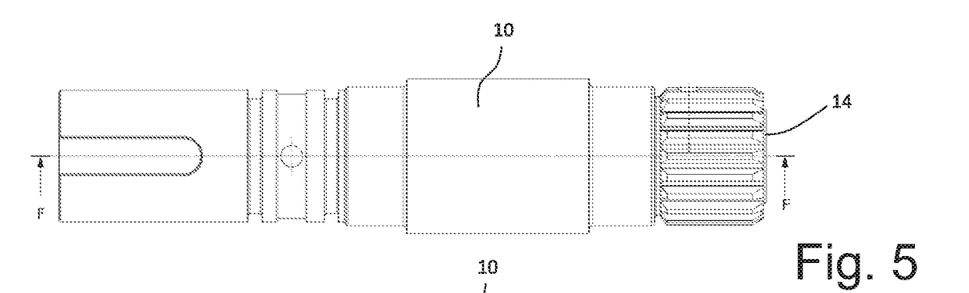
FIG. 5 shows a plan view of a second shaft acting as a counter bearing part according to the first embodiment.
Figure 6:
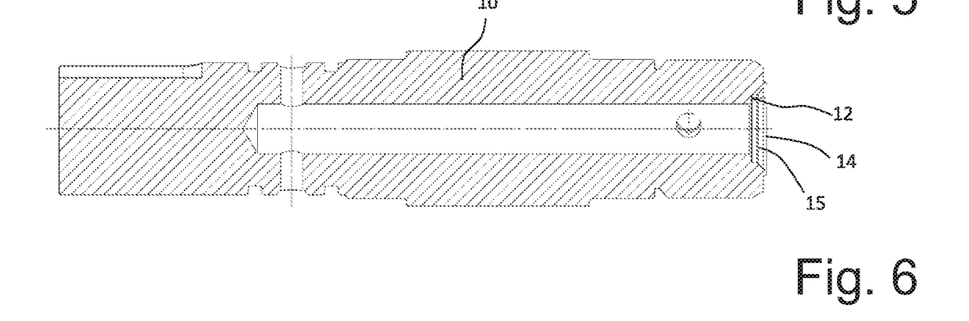
FIG. 6 shows an axial section of the second shaft of FIG. 5 according to the first embodiment.

FIG. 5 shows a plan view of a second shaft acting as the first counter bearing part 10 according to the first embodiment. FIG. 6 shows an axial section of the first counter bearing part 10 of FIG. 5 according to the first embodiment. The first counter bearing part 10 comprises a first end 14. The first end 14 has a low depression 15 that is coaxially aligned with a rotation axis of the first counter bearing part 10. The first counter thrust surface 12 is disposed orthogonally to the rotation axis of the first counter bearing part 10 within the depression 15. In FIG. 1, the first end 6 of the sun gear 1 and the first counter bearing part 10 are disposed such that the protruding portion 8 protrudes into the depression 15 such that the first thrust surface 2 and the first counter thrust surface 12 are almost in contact to one another.

Figure 7:
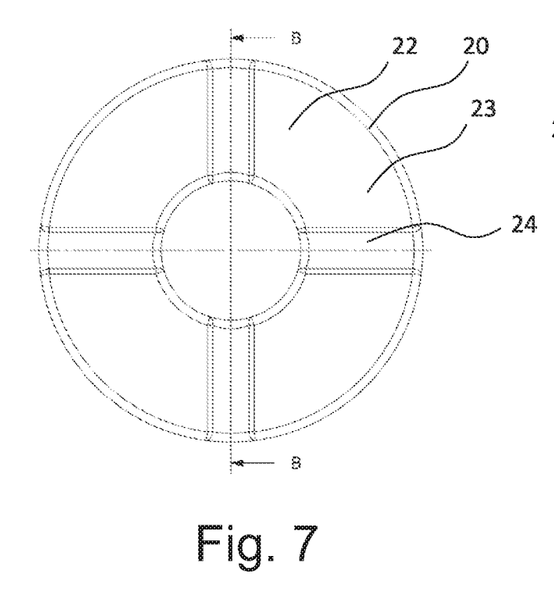
FIG. 7 shows a plan view of thrust washer according to a second embodiment.
Figure 8:
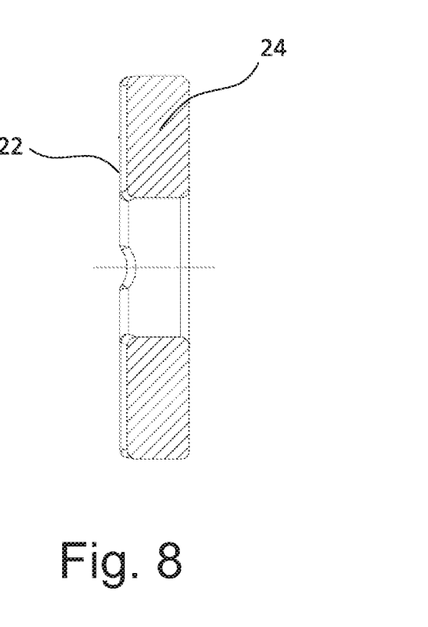
FIG. 8 shows an axial section of the thrust washer of FIG. 7 according to the second embodiment.

FIG. 7 shows a plan view of a thrust washer according to a second embodiment. In the second embodiment, the first or second counter bearing part 10 or 11 comprise multiple parts, a main body and a washer 20. The main body part and the washer 20 are rigidly connected such that rotation of the main body part results in rotation of the washer 20. In this case, the first or second counter thrust surface 12 or 13 of the first or second counter bearing part 10 or 11 is a surface 22 of the washer 20. The surface 22 can be equipped with a thrust generating geometry. In some cases, the thrust generating geometry may be produced on a washer rather than directly e.g. on a second shaft as the first counter bearing member, since it is cheaper and easier to handle. The washer 20 has a plurality of radially disposed grooves 24 for supplying lubricating oil to the thrust surface, respectively. The thrust generating geometry is produced on area sectors 23 in between the grooves 24. FIG. 8 shows an axial section of the thrust washer of FIG. 7 according to the second embodiment.

Figure 9:
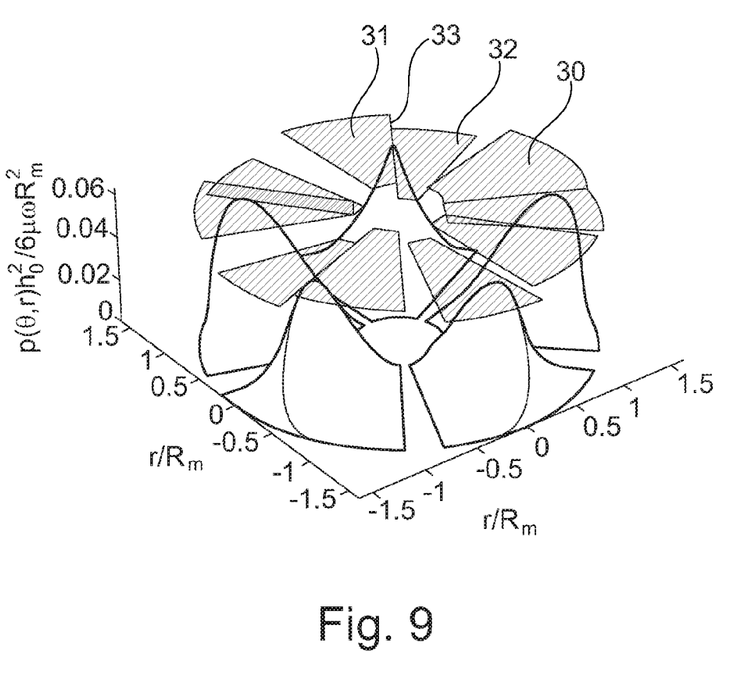
FIG. 9 shows a pressure profile of a thrust surface or counter thrust surface according to a third or fourth embodiment.

FIG. 9 shows a pressure profile of a thrust surface or counter thrust surface according to a third or fourth embodiment. FIG. 9 shows a Rayleigh-Step geometry 30 as a thrust generating geometry. The Rayleigh-step surface 30 comprises five sectors, wherein each sector has two area sections 31, 32 with a height difference 33.

Figure 10:
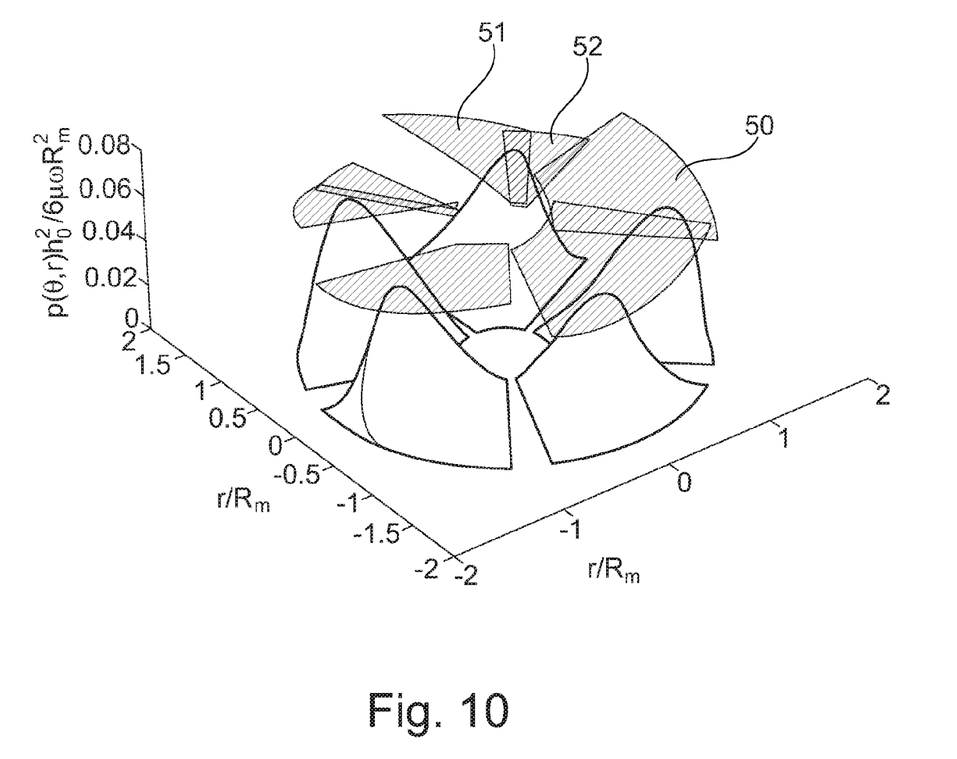
FIG. 10 shows a pressure profile of a thrust surface or counter thrust surface according to a fifth or sixth embodiment.

FIG. 10 shows a pressure profile of a thrust surface or counter thrust surface according to a fifth or sixth embodiment. FIG. 10 shows a Tapered-land geometry 50 as a thrust generating geometry. The Tapered-land geometry has five sectors, wherein each sector has a flat section 52 and a linear ramp section 51. The flat section 52 may be approximately perpendicular to central axis of the thrust surface while a linear ramp surface may extend at an acute angle relative to a plane of a flat surface.

FIGS. 9 and 10 depict geometry of a thrust surface or counter thrust surface that facilitates creation of a fluid film. Without being limited to any particular theory, the flat sections 52 or the lower area sections 32 provide space for lubrication fluid to enter the thrust generating geometry. During rotation of the thrust surface or counter thrust, the fluid then moves toward the upper area sections 31 or along the ramp sections 51 toward an opposing thrust surface or counter thrust surface. The moving fluid will build up at the distal ends of the upper area sections 31 or the ramp sections 51 and the generated fluid film will create a thrust force against an opposing thrust surface or counter thrust surface. For example, in the embodiment of FIG. 1, either thrust surface 2 or the counter thrust surface 12 may comprise a thrust generating geometry. The thrust generating geometry will facilitate fluid building up between thrust surface 2 and the counter thrust surface 12 reducing friction and providing lubrication to the components.

Furthermore, the fluid film may further allow lubrication to flow past the thrust surface 2 and the counter thrust surface 12 to lubricate other components. For example, lubrication may be provided by channels within an interior portion of the sun gear and the lubrication may move radially outward with rotation. However, if the thrust surface 2 and the counter thrust surface 12 are in metal to metal contact, the contact may prevent lubrication from moving past the thrust surfaces. The building up of a fluid film between thrust surface 2 and the counter thrust surface 12 may allow for lubrication to flow beyond the thrust surfaces to other components.

FIGS. 1-10 are shown approximately to scale. FIGS. 1-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example.

As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A sun gear for use in a planetary gear system, comprising:
 a helical toothing; and
 a first and a second thrust surface which are configured to axially support the sun gear at a first and a second counter thrust surface, respectively,
 wherein the first and the second thrust surface have a thrust generating geometry that is configured to build up a lubrication fluid film between the first thrust surface and the first counter thrust surface and between the second thrust surface and the second counter thrust surface during rotation of the sun gear, and the thrust generating geometry is one of a Rayleigh-Step thrust surface or a Tapered-Land thrust surface.

2. The sun gear according to claim 1, wherein the first and/or second thrust surface comprises five identical sectors, each sector covering a sector angle between 59° and 63° and varying in height.

3. The sun gear according to claim 1, wherein the first and/or second thrust surface comprise a plurality of radially disposed grooves for supplying lubricating oil to the first and second thrust surface, respectively.

4. The sun gear according to claim 1, wherein the first and/or second thrust surface is a Rayleigh-Step thrust surface and a step height of the Rayleigh-Step thrust surface is between 1.5 and 2.5 μm being located between 55% and 59% of each sector angle.

5. The sun gear according to claim 1, wherein the first and/or second thrust surface is a Tapered-Land thrust surface and a flat-land height of the Tapered-Land thrust surface is between 3.5 and 4.5 μm and a linear ramp section of the Tapered-Land thrust surface extends up to between 72% and 76%.

6. A counter bearing part for axially supporting a sun gear, comprising:
a first or a second counter thrust surface for axially supporting the sun gear at a first thrust surface or at a second thrust surface, respectively,
wherein the first or second counter thrust surface has a thrust generating geometry that is configured to build up a lubrication fluid film between the first or second counter thrust surface of the counter bearing part and the first thrust surface or the second thrust surface of the sun gear during rotation of the sun gear, and the thrust generating geometry is one of a Rayleigh-Step thrust surface or a Tapered-Land thrust surface.

7. The counter bearing part according to claim 6, wherein the first or second counter thrust surface comprises five identical sectors, each sector covering a sector angle between 59° and 63° and varying in height.

8. The counter bearing part according to claim 6, wherein the first or second counter thrust surface comprises a plurality of radially disposed grooves for supplying lubricating oil to the first or second thrust surface, respectively.

9. The counter bearing part according to claim 6, wherein the first or second counter thrust surface is a Rayleigh-Step thrust surface and a step height of the Rayleigh-Step thrust surface is between 1.5 and 2.5 μm being located between 55% and 59% of each sector angle.

10. The counter bearing part according to claim 6, wherein the first or second counter thrust surface is a Tapered-Land thrust surface and a flat-land height of the Tapered-Land thrust surface is between 3.5 and 4.5 μm and a linear ramp section of the Tapered-Land thrust surface extends up to between 72% and 76%.

11. A bearing arrangement for axially supporting a sun gear, comprising:
a sun gear comprising a helical toothing and a first and a second thrust surface which are configured to axially support the sun gear at a first and a second counter thrust surface, respectively, wherein the sun gear is integrally formed,
a first counter bearing part comprising the first counter thrust surface for axially supporting the sun gear at the first thrust surface, and
a second counter bearing part comprising the second counter thrust surface for axially supporting the sun gear at the second thrust surface,
wherein one of the following have a thrust generating geometry:
the first and the second thrust surface,
the first thrust surface and the second counter thrust surface,
the second thrust surface and the first counter thrust surface,
the first counter thrust surface and the second counter thrust surface, or
the first and second thrust surface and the first and second counter thrust surface, and
the thrust generating geometry being configured to build up a lubrication fluid film between the first thrust surface and the first counter thrust surface and between the second thrust surface and the second counter thrust surface during rotation of the sun gear.

12. The bearing arrangement according to claim 11, further comprising at least one thrust washer comprising one of the first thrust surface and the second thrust surface.

13. The bearing arrangement according to claim 12, wherein the first and second thrust washers are each disposed on a side of the main body part along an axial direction of the sun gear opposite the first and second counter thrust surface, respectively.

14. The bearing arrangement according to claim 11, wherein one or more of the thrust surfaces and counter thrust surfaces having the thrust generating geometry comprise five identical sectors, each sector covering a sector angle between 59° and 63° and varying in height.

15. The bearing arrangement according to claim 11, wherein one or more of the thrust surfaces and counter thrust surfaces having the thrust generating geometry comprise a plurality of radially disposed grooves for supplying lubricating oil to the respective thrust surfaces or counter thrust surfaces.

16. The bearing arrangement according to claim 11, wherein one or more of the thrust surfaces and counter thrust surfaces having the thrust generating geometry is a Rayleigh-Step thrust surface.

17. The bearing arrangement according to claim 16, wherein a step height of the Rayleigh-Step thrust surface is between 1.5 and 2.5 μm being located between 55% and 59% of each sector angle.

18. The bearing arrangement according to claim 11, wherein one or more of the thrust surfaces and counter thrust surfaces having the thrust generating geometry is a Tapered-Land thrust surface.

19. The bearing arrangement according to claim 18, wherein a flat-land height of the Tapered-Land thrust surface is between 3.5 and 4.5 μm and a linear ramp section of the Tapered-Land thrust surface extends up to between 72% and 76%.

* * * * *